US008074481B2

(12) United States Patent
Bass et al.

(10) Patent No.: US 8,074,481 B2
(45) Date of Patent: Dec. 13, 2011

(54) RADIO FREQUENCY IDENTIFICATION (RFID) SYSTEM FOR MANUFACTURING, DISTRIBUTION AND RETAILING OF KEYS

(75) Inventors: Michael A. Bass, Chagrin Falls, OH (US); Sandra Dively, Sagamore Hills, OH (US); Robert Steinberg, Shaker Heights, OH (US); Richard W. Ryai, Sr., North Royalton, OH (US)

(73) Assignee: Hy-Ko Products Company, Northfield, OH (US)

( * ) Notice: Subject to any disclaimer, the term of this patent is extended or adjusted under 35 U.S.C. 154(b) by 0 days.

(21) Appl. No.: 12/965,319

(22) Filed: Dec. 10, 2010

(65) Prior Publication Data
US 2011/0079652 A1 Apr. 7, 2011

Related U.S. Application Data

(63) Continuation of application No. 11/224,194, filed on Sep. 12, 2005, now Pat. No. 7,849,721.

(51) Int. Cl.
*E05B 19/04* (2006.01)

(52) U.S. Cl. .......... 70/408; 70/278.2; 70/456 R; 70/257; 307/10.1; 340/5.61

(58) Field of Classification Search .................. 70/257, 70/456 R, 252, 408, 278.1–278.3; 307/10.1–10.3; 340/5.61, 5.62, 5.21, 5.26
See application file for complete search history.

(56) References Cited

U.S. PATENT DOCUMENTS

| | | | | |
|---|---|---|---|---|
| 6,427,504 B1 * | 8/2002 | Janssen et al. | | 70/278.3 |
| 6,457,337 B1 * | 10/2002 | Hattick et al. | | 70/278.3 |
| 6,637,245 B1 * | 10/2003 | Bolton | | 70/408 |
| 6,952,156 B2 * | 10/2005 | Arshad et al. | | 340/5.6 |
| 6,998,956 B2 * | 2/2006 | Dix | | 340/5.2 |
| 7,098,791 B2 * | 8/2006 | Okada | | 340/568.1 |
| 2003/0189482 A1 * | 10/2003 | Arshad et al. | | 340/5.61 |
| 2003/0200778 A1 * | 10/2003 | Chhatwal | | 70/408 |
| 2003/0210128 A1 * | 11/2003 | Dix | | 340/5.27 |
| 2004/0095380 A1 * | 5/2004 | Bass et al. | | 345/738 |
| 2004/0252030 A1 * | 12/2004 | Trimble et al. | | 340/825.36 |
| 2004/0263316 A1 * | 12/2004 | Dix et al. | | 340/5.23 |
| 2005/0088279 A1 * | 4/2005 | Denison et al. | | 340/5.23 |
| 2006/0230796 A1 * | 10/2006 | Keller et al. | | 70/278.3 |

* cited by examiner

*Primary Examiner* — Suzanne Barrett
(74) *Attorney, Agent, or Firm* — Calfee, Halter & Griswold LLP

(57) ABSTRACT

A key assembly having an identification member secured to the key. In one embodiment, the identification member includes a programmable device that contains information indicative of one or more characteristics of the key that can be used to identify at least one of a) the type of key, b) the type of key blank, c) an origination address, d) a destination address, e) a manufacturer, f) a manufacturing date, and g) a lot number. Another embodiment may include a key, and an identification member secured to the key, wherein the identification member includes a programmable device that contains information indicative of a) the key type, b) the type of key blank, and c) cutting instructions for a key cutter to determine cut characteristics. Additional embodiments may include an automobile key and an identification member secured to the automobile key, where in the identification member includes memory for use as mobile data storage.

14 Claims, 13 Drawing Sheets

RADIO FREQUENCY IDENTIFICATION (RFID) SYSTEM FOR MANUFACTURING, DISTRIBUTION AND RETAILING OF KEYS

RELATED APPLICATIONS

This non-provisional patent application is a continuation of and claims the benefit of, and priority to, U.S. patent application Ser. No. 11/224,194 filed on Sep. 12, 2005, and U.S. Provisional Patent Application No. 60/609,188, filed on Sep. 10, 2004, both of which are entitled "Radio Frequency Identification (RFID) System for Manufacturing, Distributing and Retailing of Keys." The specifications of which is hereby incorporated in their entirety.

FIELD OF INVENTION

This invention relates generally to the application of Radio Frequency Identification ("RFID") technology to the key industry or similar industries with relatively fungible, yet nuanced products. Specifically, the invention relates to systems that include the use of RFID tags to identify a key or a group of keys for purposes of gaining efficiency and accuracy in the supply chain.

BACKGROUND

The identification of objects that are relatively fungible, but possess minute yet important nuances or details, can be a difficult, tedious and time consuming. As will be readily recognized by those familiar with such enterprises, a failure to accurately identify such objects with regularity can have unintended or undesirable consequences.

This difficulty of identification causes additional difficulties when counting, inventorying, distributing and retailing such fungible objects. These difficulties may occur throughout the entire supply chain for these objects or products—from manufacturing through distribution and into retailing. The key industry is one such industry in which the relatively fungible nature of the products leads to difficulties in identification, counting, inventorying, distributing, and retailing.

The key industry supply chain includes many "nodes" at which key or key blanks change hands. For example, keys are handled by manufacturers, truckers, customs agents, shippers, wholesalers, and retailers, many of which may be located overseas and often handle hundreds, if not thousands, of types of keys or key blanks. Many of these keys or key blanks are not readily distinguishable from other similar keys or key blanks, which adds complexity and cost to the supply chain. At each node in the supply chain, many administrative tasks must be completed, such as inventorying and counting the keys in a shipment. At each node, transmittal and bill of lading documents must be reviewed and created. Currently, these processes are accomplished via expensive, inaccurate manual counts and human visual reviews. The current processes may result in higher than required safety stocks, stock outs, lost sales, miscut keys and other unnecessary expenses.

Utility patent application Ser. No. 10/633,933, entitled OBJECT IDENTIFICATION SYSTEM, which is incorporated herein in full and attached hereto as Appendix A, presents solutions for some common issues that arise in the duplication of certain fungible keys at retail locations in the supply chain. However, there still remains a need to develop additional solutions for duplication issues and for the many other issues presented by the movement of products with a fungible nature, such as keys, through the supply chain.

SUMMARY

A key assembly having an identification member secured to the key. In one embodiment, the identification member includes a programmable device that contains information indicative of one or more characteristics of the key that can be used to identify at least one of a) the type of key, b) the type of key blank, c) an origination address, d) a destination address, e) a manufacturer, f) a manufacturing date, and g) a lot number. Another embodiment may include a key, and an identification member secured to the key, wherein the identification member includes a programmable device that contains information indicative of a) the key type, b) the type of key blank, and c) cutting instructions for a key cutter to determine cut characteristics. Additional embodiments may include an automobile key and an identification member secured to the automobile key, where in the identification member includes memory for use as mobile data storage.

DETAILED DESCRIPTION

This application will present Radio Frequency Identification (RFID) systems designed to address the fungibility difficulties that occur throughout the key industry supply chain, including key duplication, and to gain heretofore unattainable efficiencies by incorporating RFID technology into the manufacture, distribution, and retail sale of keys and key blanks.

RFID systems are capable of identifying, counting, and tracking RFID tagged keys through the use of solid state silicon chips and radio waves. RFID has numerous advantages versus existing methods and technologies currently used in the key industry. Current methods include manual counting, mechanical counting, and universal product code (UPC) systems. The automated nature of RFID reduces labor, increases accuracy and provides higher quality information for identifying, counting, and tracking keys. Custom Software can be part of an RFID system to evaluate, utilize, and manipulate information gathered to reduce costs and increase accuracy and efficiency throughout the key supply chain. For example, software can automate the creation of transmittal and bill of lading, can reduce inventory expenses by reducing safety stocks throughout the supply chain, and can increase sales by eliminating stock outs throughout the key supply chain. Automatic identification by RFID also facilitates other transactions, for example, proper key blank selection for cutting a duplicate key and identifying inventory losses or shrinkage.

An RFID system can be comprised of a variety of components and can be configured in a variety of ways. Depending on the purpose served by an RFID system, the system may comprise combinations of the following hardware: RFID tags attached to individual products, shipping containers, and pallets; RFID readers, attached or incorporated into merchandising display racks, loading and unloading equipment, shipping vehicles, and warehousing locations; RFID multiplexers, attached or incorporated into merchandising racks, loading and unloading equipment, shipping vehicles, and warehousing locations; handheld or portable RFID readers; computer hardware, such as computers, servers, monitors, and printers; telecommunications hardware, such as modems and routers; and key cutting machines. Also incorporated into RFID systems can be software components, including: RFID reader software or middleware; database software; telecommunications software; network and internet integration software; and user interface or graphic interface software.

Those skilled in the art will readily recognize that RFID systems included in this application can be comprised of any combination of hardware and software components detailed in this application. In addition, those skilled in the art will readily appreciate that combinations of hardware and software components that are similar or equivalent to those described in this application are also included in this application.

Figure 1:
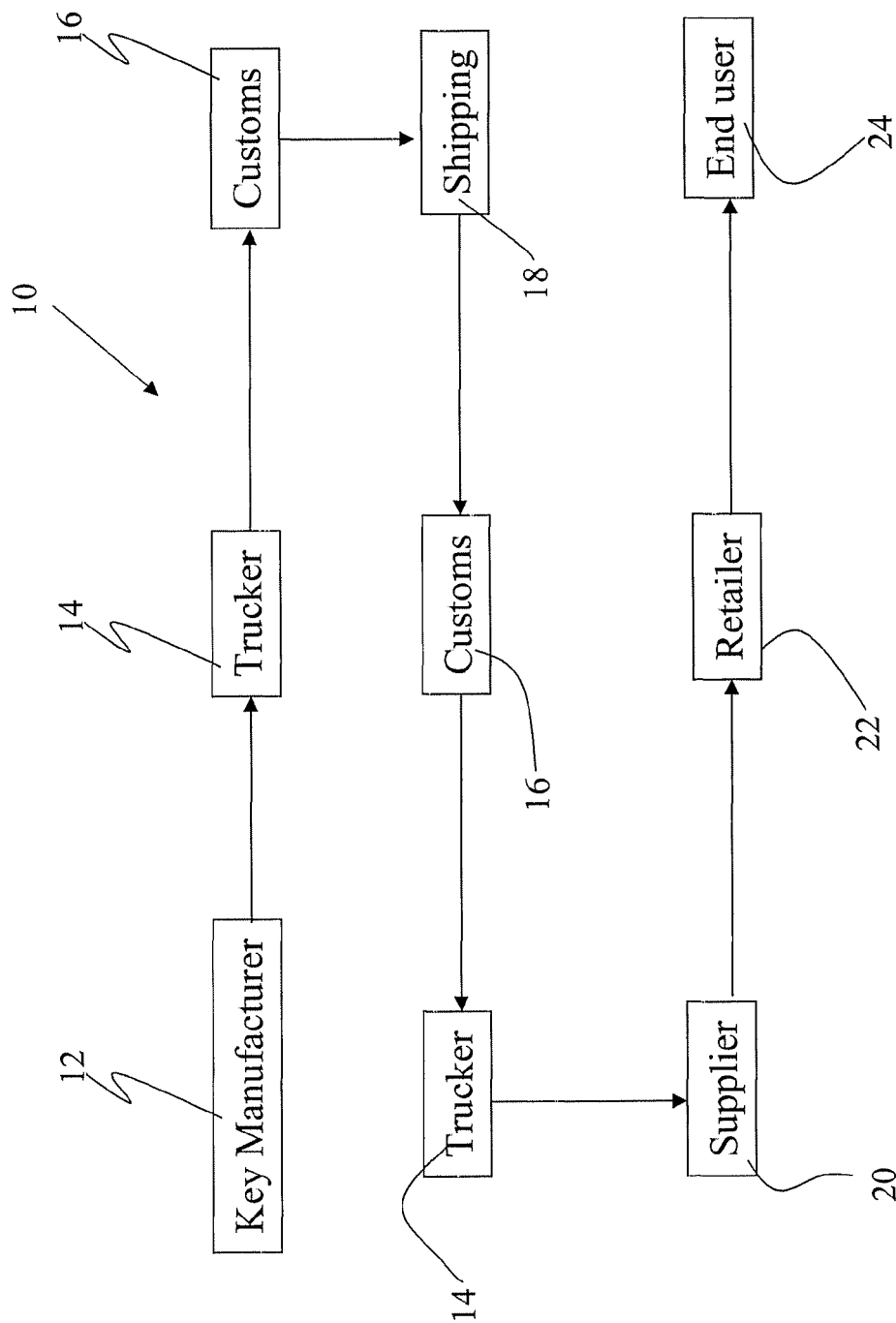
FIG. 1 is a chart illustrating a supply chain for the key industry.

The present invention discloses methods of utilizing RFID systems to increase accuracy and efficiency in a supply chain used in the key industry. FIG. 1 shows nodes of a typical supply chain 10 used for the key industry. The illustration of FIG. 1 is exemplary only and a supply chain 10 can comprise any combination of the nodes shown and could, in addition, include nodes that are not illustrated in FIG. 1. In the exemplary illustration a key or key blank originates at a key manufacturer 12. Keys leave the manufacturing facility, normally via a trucker 14, and may have to pass through a customs inspection 16 if the key is passing through an international or state boarder. The keys may then be shipped 18 and re-inspected by customs 16 upon reaching a destination country. The keys may then be moved by a trucker 14 to a supplier, distributor, or wholesaler 20. The keys will then be sent a retailer 22, who will sell the keys or key blanks to the end user 24.

In order to efficiently utilize an RFID system to track keys moving through a supply chain 10, RFID tags can be incorporated or attached to keys, key blanks, prefabricated keys, original keys, and the like. For the purposes of this application, the terms "key" and "key blank" will include keys, key blanks, prefabricated keys, original keys, groups of keys, and the like. Tags can be attached to or incorporated into keys in a variety of ways.

Figure 2:
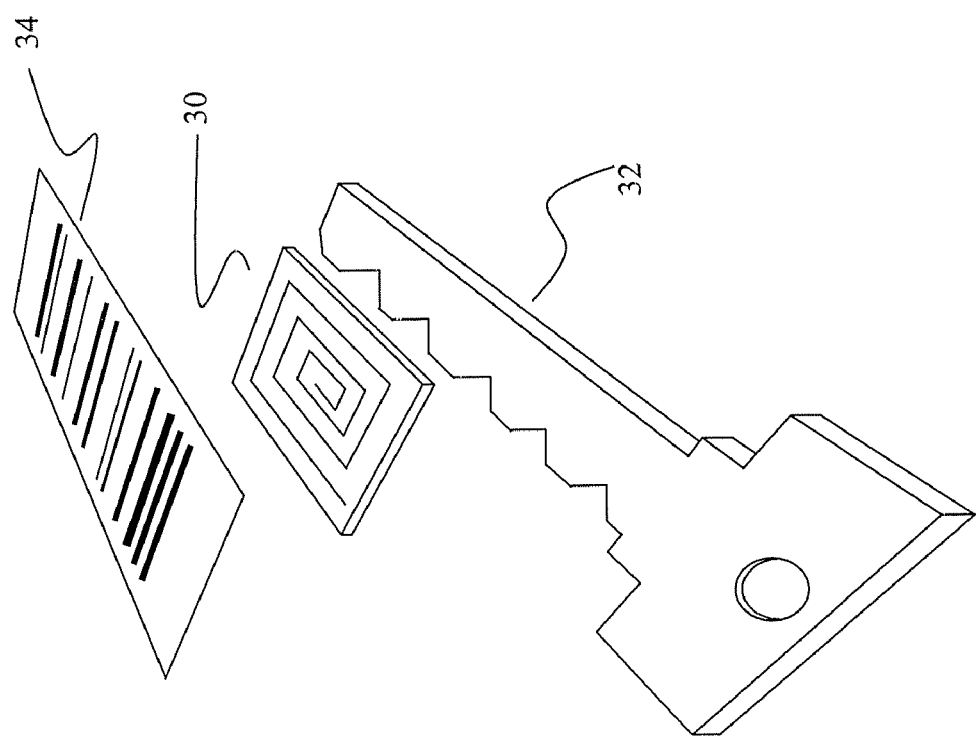
FIG. 2 an exploded view of a RFID tag attached to a key by a one-sided adhesive label.

Referring to FIG. 2, one embodiment of an RFID tag 30 attached to a key 32 is illustrated. FIG. 2 is an exploded view showing a key 32, an RFID tag 30, and a one-sided adhesive UPC label 34. A RFID tag 30 can be attached to the adhesive side of the UPC label 34, which is then attached to the key 32.

The use of a UPC one-sided label 34 is for convenience, as UPC labels are commonly used in the key industry to identify keys. As the key market adjusts to the introduction of RFID technology, there will be a period of overlap where the current UPC systems will coexist with novel RFID systems. This embodiment accounts for that overlap. An alternative embodiment is to use a blank one-sided adhesive label to secure a tag to a key. This embodiment may be more practical when keys pass through a supply chain 10 that has fully adopted RFID technology.

Figure 3:
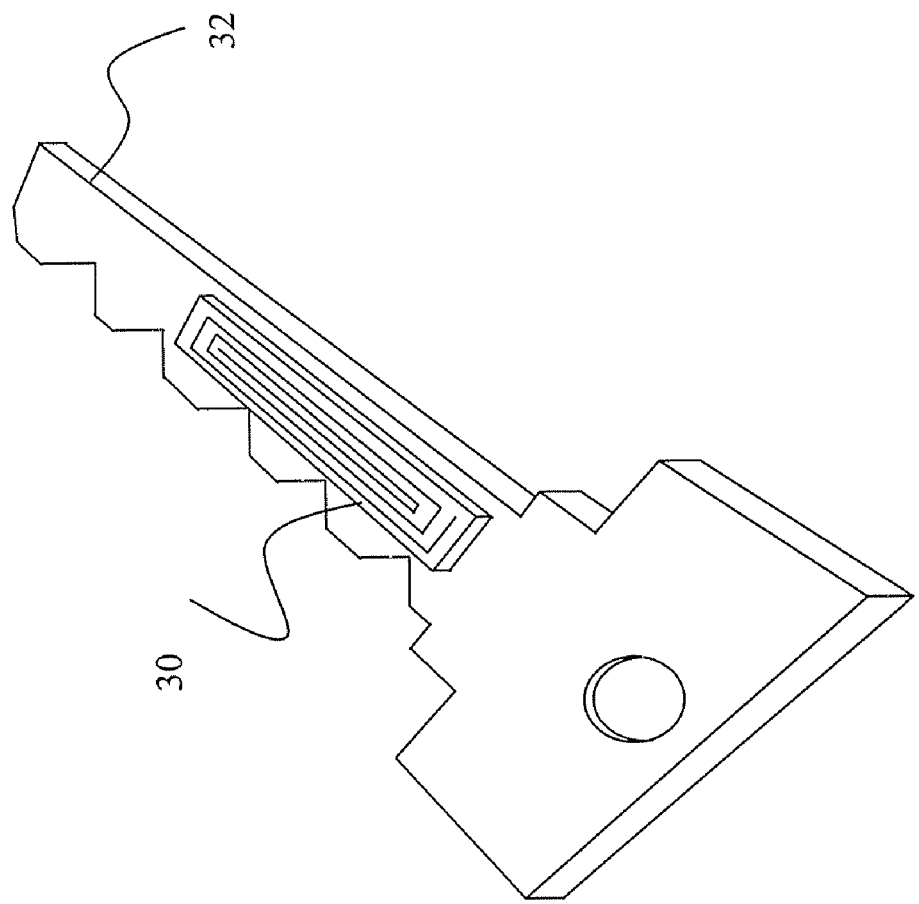
FIG. 3 is a perspective view of a RFID tag attached to a key body.
Figure 4:
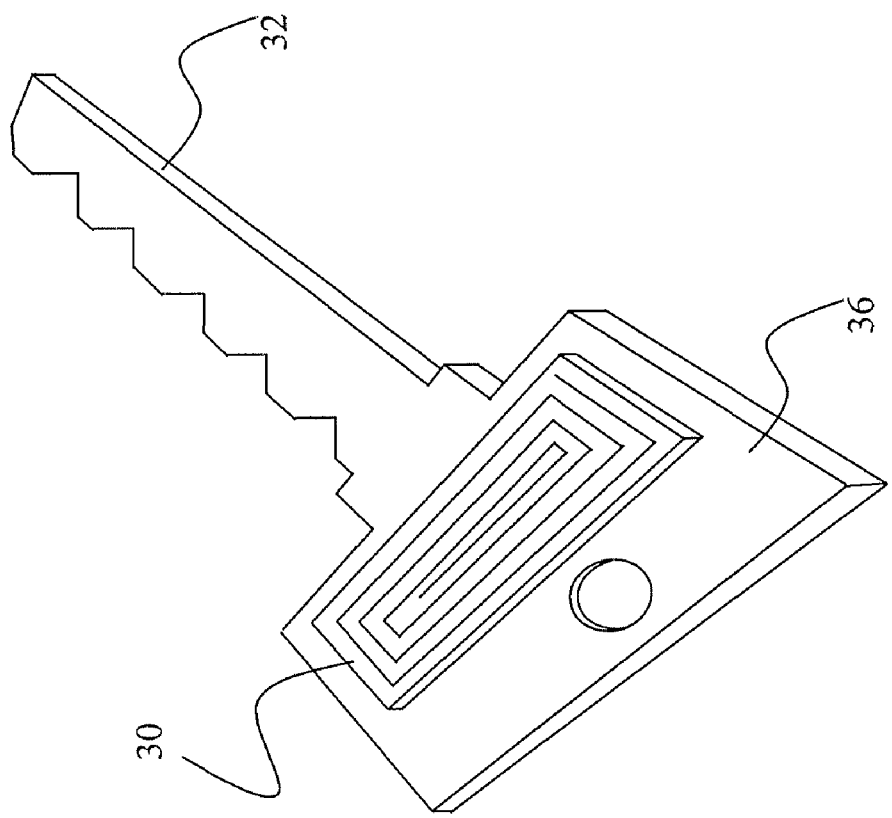
FIG. 4 is a perspective view of a RFID tag attached to a head of a key.

FIG. 3 illustrates another embodiment of a tag 30 attached to a key 32. In this embodiment, the RFID tag 30 is affixed directly to the key 32 itself. A tag 30 can be affixed either permanently or in a manner that allows the tag 30 to be removed at any point in the supply chain 10. Optionally, the affixing of the RFID tag 30 can be limited to the head 36 of the key 32, as illustrated in FIG. 4. This area of the key can be designed to provide ample room for the placement of an RFID tag 30. In addition, the head 36 of the key 32 is not affected by the cutting of teeth into a key 32 and would be more likely left undisturbed by the process of cutting a replacement key.

In another embodiment, only the silicon chip portion of an RFID tag is affixed directly to a metal key. In this embodiment, the key itself serves as the antenna by which the information is relayed to an RFID reader. The placement of the chip could be anywhere on the key that allows for contact with a metal portion of the key.

Figure 5:
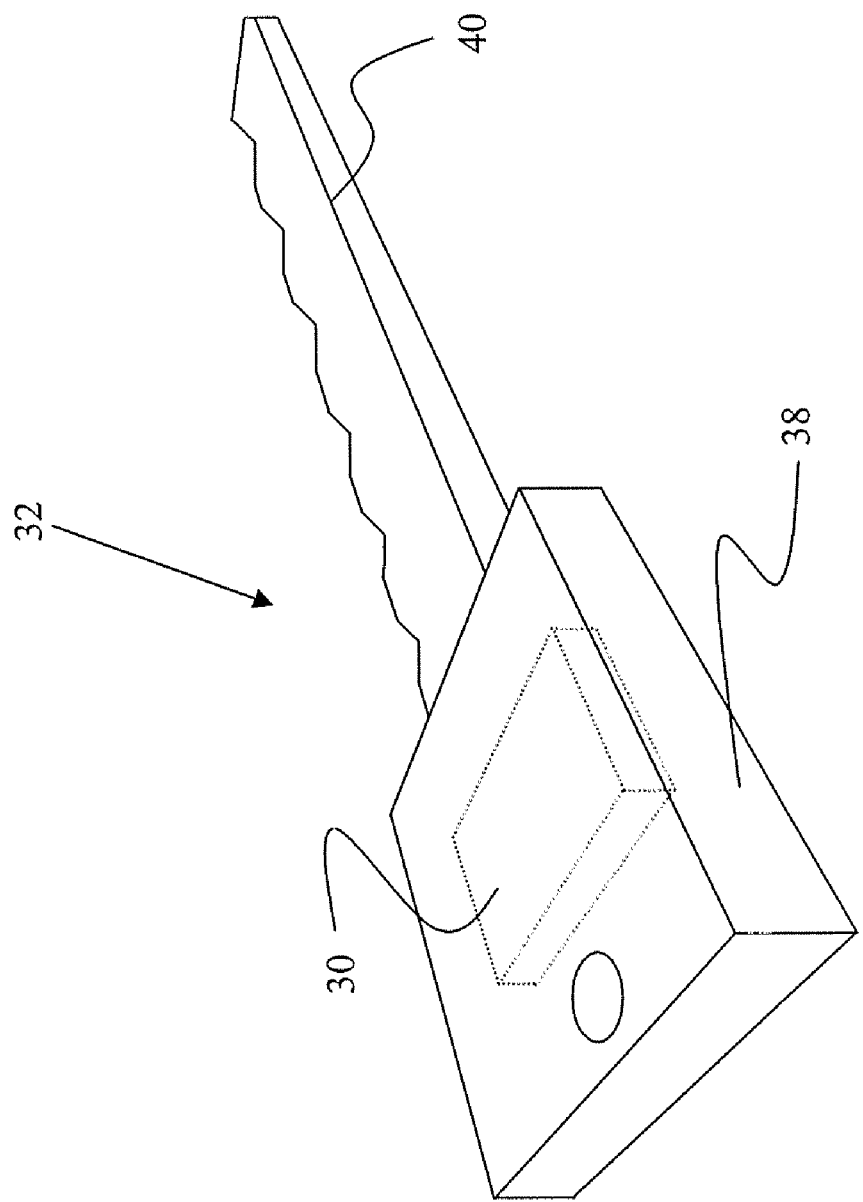
FIG. 5 is a perspective view of a RFID tag incorporated into the head of a key.

FIG. 5 illustrates an alternative embodiment of the invention where an RFID tag 30 is incorporated directly into the key 32. One optional method of achieving this is to make all, or a portion, of the key 32 out of a plastic material. It is common for keys to be manufactured with a plastic head 38 and a metal body 40, which extends from the plastic head 38. In addition, with advancements in thermal set plastics and other polymer technologies, it is practical to manufacture an entire key 32 out of a plastic material. An RFID tag 30 can be incorporated into a key 32 by embedding the tag 30 in a plastic portion of the key during the molding process used to manufacture the plastic portion of the key. FIG. 5 illustrates an embodiment where an RFID tag 30 is incorporated into the plastic head 38 of a key 32.

Figure 6:
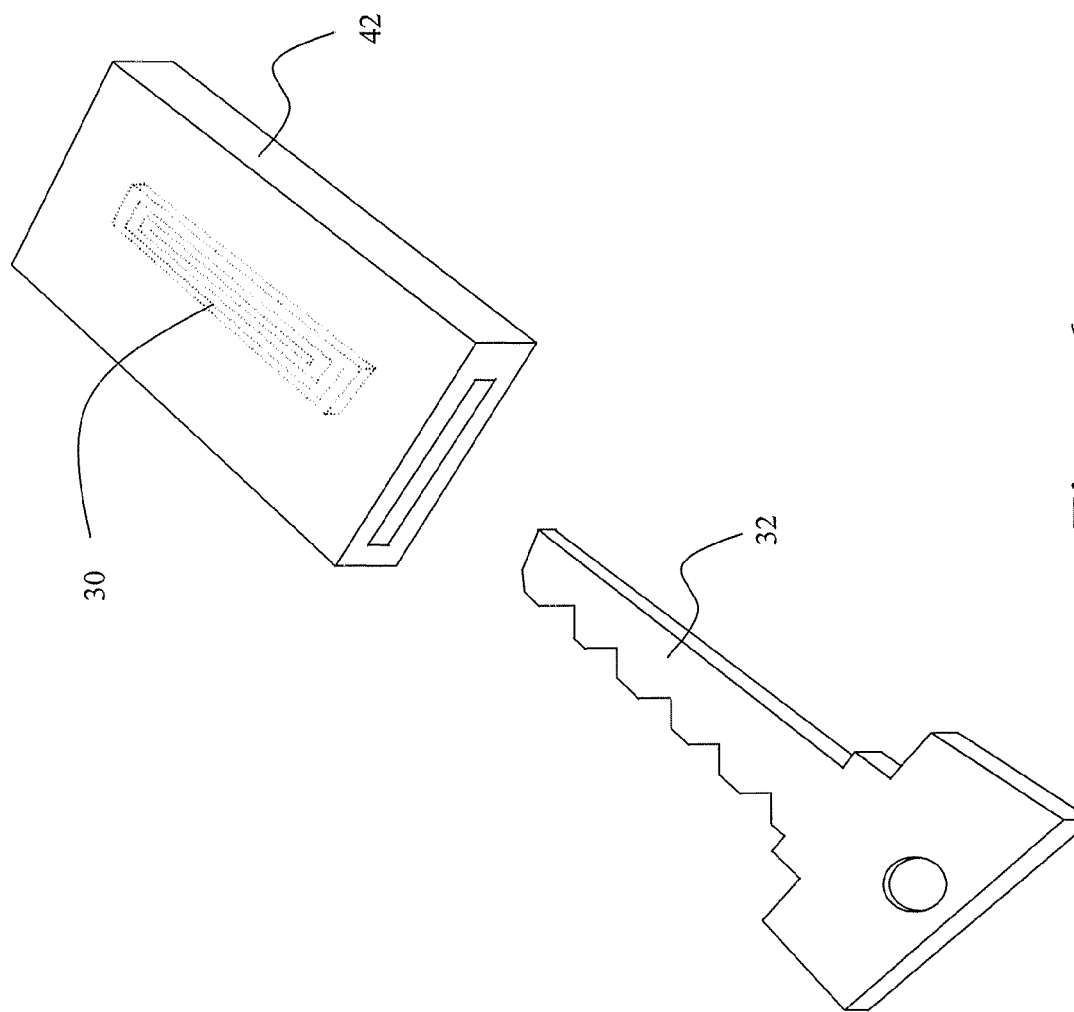
FIG. 6 is a perspective view of a RFID tag attached to a sheath for a key.

FIG. 6 illustrates an alternative embodiment of the invention, where the RFID tag 30 is permanently incorporated into a plastic sheath or sleeve 42 by injection molding or other means. The key 32 can be conveniently inserted or removed from the sheath or sleeve 42. The RFID tag 30 residing in the sheath or sleeve 42 can be reprogrammed and reused upon removal of the key 32. In an alternative embodiment, a RFID tag 30 can be attached or adhered to a surface of the sheath or sleeve 42.

Figure 7:
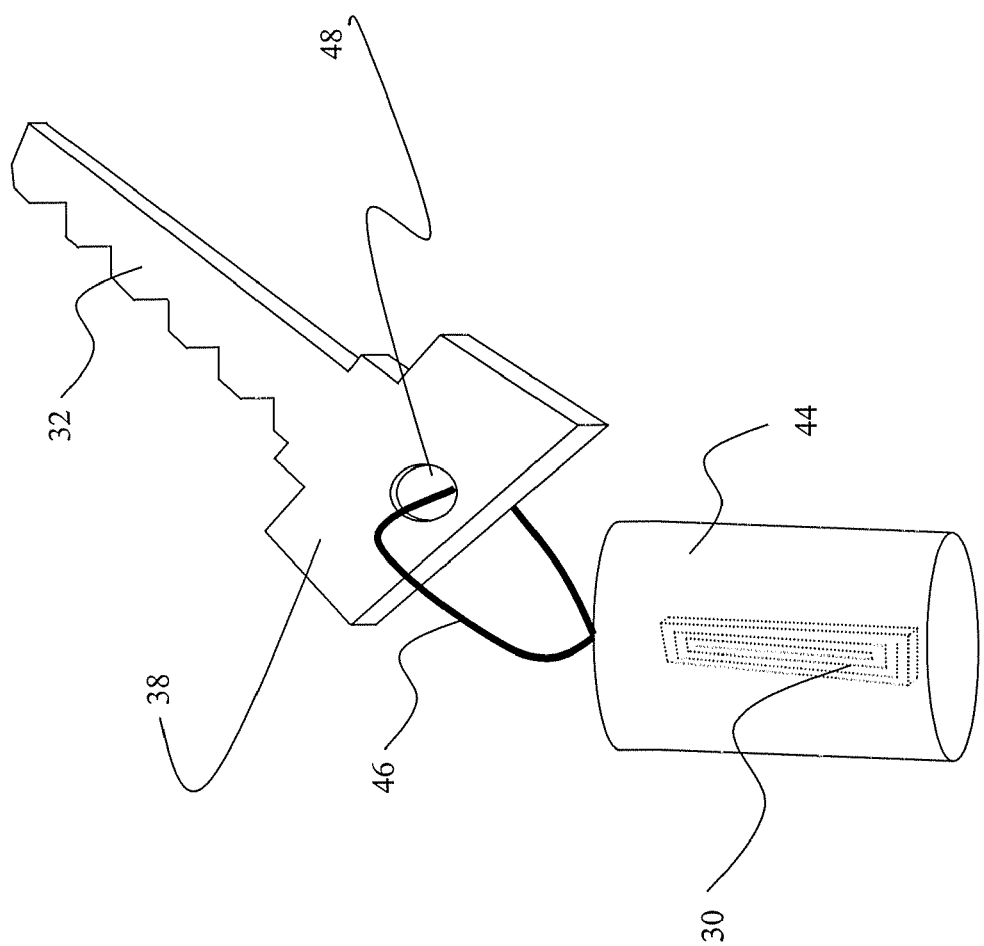
FIG. 7 is a perspective view of a RFID tag incorporated into a cylinder, which is attached to a key.

FIG. 7 illustrates another alternative embodiment, where the RFID tag 30 is permanently incorporated into a member 44. The member 44 may be any shape, for instance a disc, cube, or cylinder and may be manufactured out of plastic by injection molding or other means. The member 44, with the incorporated RFID tag 30, can be attached to the key 32 by means of chain, strap or other ligament 46 through a hole 48 in the head 38 of the key 32. Because RFID tags 30 can be relatively expensive, the tag 30 attached to the key 32 can be reused or recycled after the key 32 is ultimately sold to the consumer. In an alternative embodiment, an RFID tag 30 can be attached to or adhered to a surface of the member.

In addition to using RFID tags that are attaching or affixing directly to keys, an RFID system may utilize RFID tags that are attached or affixed to a container or multiple containers holding numerous keys. Such a container could hold a "manufactured lot" or "keys in bulk." The information stored on the RFID tag can contain information that is general to the keys in the container, such as number and type of keys or who manufactured the keys.

Once an RFID tag 30 is attached to a key 32 or a container of keys, information regarding the keys 32 or key lot can be stored or "written" onto the tag 30. This information can be retrieved using RFID readers. RFID readers transmit and receive RF signals and can gather information stored on RFID tags 30. A RFID reader can also receive and respond to commands from a host computer and transfer data gathered from RFID tags 30 to the host computer. There are various types of RFID readers. Fixed RFID readers can be permanently affixed to stationery objects such as walls, or mounted on stands or portals. Tunnel readers can be mounted on conveyors. Mobile readers can be mounted on forklifts or pickers. Hand held readers provide portability and close range. The selection of a reader depends on the demands of a specific key supply chain node.

RFID software can be utilized for many different purposes in RFID systems. Reader software or middleware can be responsible for RFID reader configuration and administration, data filtering and event management via business rules written specifically for each node in a supply chain 10. Network and web integration software can be responsible for routing gathered data to the correct application and correct node in the supply chain 10, for guaranteeing delivery and for interfacing with applications. Application software can be responsible for creating a database for tracking and counting key inventory by location.

User interface software can generate a graphical dash board that supports an RFID system user in making timely business decisions based on the information displayed, such as type of keys, by revealing the stock keeping unit ("SKU"), and location and number of specific keys regarding the disposition of inventories across the key supply chain 10. Decisions made based on displayed information include increasing or decreasing the rate of production for specific keys, decreasing or increasing safety stock levels at any node, restocking a retail location, holding a sale to decrease overstock inventory and diverting inventory from one location to another. The system could be configured to notify the system user of the need to take action or to actually perform the action required according to a set of predetermined business rules. Thus, the system may automatically restock keys or key blanks at a given location but not at another by electronically ordering only the necessary items at the necessary locations. Furthermore, the user interface software may provide this information on a local store basis, regional basis, or by national store brand. Additional insights can be gained from near real time inventory tracking, include identification of stores and shifts at which significant trends or cycles are taking place or in which shrinkage occurs. These insights can be used to take appropriate action to maximize sales and minimize losses. Furthermore, trends and projections from historical data can be plotted on graphs and evaluated through "what if" scenarios to determine the optimal response. All of these rules, decisions, and methods can be based on data gathered by the RFID reader or combinations of RFID readers that are used to track and gather information from the key RFID tags 30.

Figure 8:
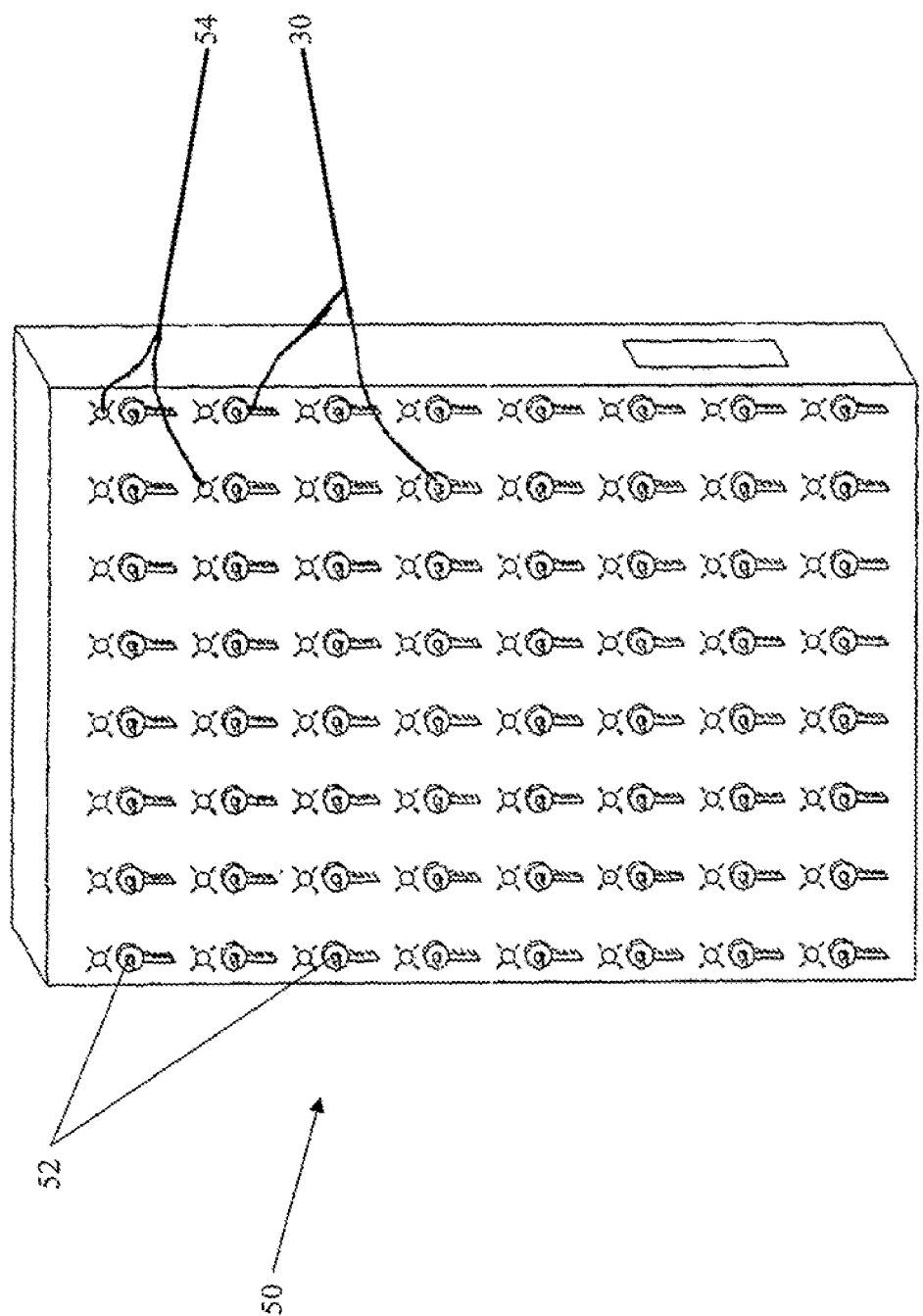
FIG. 8 is a perspective view of a RFID-enabled merchandising rack.

FIG. 8 illustrates an element that can be incorporated into an RFID system to increase efficiency and accuracy in the retail portion 22 of the supply chain 10, an RFID-enabled merchandising rack 50. This rack 50 is disclosed in U.S. patent application Ser. No. 10/633,933, as part of a key identification system ("KID system"), which is attached hereto as Appendix A. This rack 50 can be utilized in retail facilities to store keys and key blanks 32. The rack 50 can facilitate organizing and displaying the keys 32. FIG. 8 illustrates keys 32 displayed on spindles or pegs 52. In an alternative embodiment, keys 32 can be displayed in bins. Bins can be used for key blanks kept in bulk quantities due to their status as "fast movers."

In the embodiment illustrated in FIG. 8, the rack 50 can utilize one or more RFID readers and a number of multiplexed antennas. In an alternative embodiment, these antennas may serve as the spindle or peg 52 upon which the keys 32 are stored and displayed. Each antenna, similar to typical readers, creates a separate read zone of radio frequency energy which reads information from any RFID tagged key 32 in or entering into the read zone. Multi-colored light emitting diodes (LED's) 54 may be located above the spindles 52 (as shown in FIG. 8) or at the end of the spindles 52 to serve as visual indicators to be energized based on circumstance.

For an embodiment of a RFID-enabled merchandising rack that stores and displays bulk key and key blanks 32 in bins, the rack may utilize one or more RFID readers, one or more antennas that may be multiplexed and a device for measuring the weight of keys 32 stored in each bin. The number of keys in each bin is estimated by dividing the total weight of the keys 32 in a bin by the weight of a single key 32 of the type in the bin.

There are many radio frequencies that can be utilized by RFID systems used in a supply chain 10. These frequencies include, but are not limited to, low frequency (approximately 125-135 KHz), high frequency (approximately 13.56 MHz) and ultra high frequency (approximately 860-930 MHz). The preferred mode for the RFID systems and for the RFID-enabled merchandising rack 50 is 13.56 MHz. It provides the best compromise between RFID tag 30 cost and ability to provide distinct and appropriate read zones for the RFID-enabled merchandising rack 50.

In an RFID system, the RFID-enabled merchandising rack 50 may communicate with other components of the system. For instance, the rack 50 can communicate with an RFID reader, which then communicates with a host computer. This may allow inventory and other data to be used by the system to make decisions through application logic or allow a user of the system to make decisions based on display information shown through a user interface. There are multiple methods for establishing communication between the components of a RFID system. These methods include, but are not limited to, a dialer connecting to a hard-wired telephone line, a cell phone connecting to a network, and through a local area network (LAN) or wireless local area network (WLAN).

A communication interface between a host computer and a system user can be a vital element in an RFID system. The communication of information or data to a system user can be converted to actionable information on which business decisions are made. The actionable information can includes graphic and numerical representations of inventory at each store location, each region of the country, or each distribution facility. The user interface can represent this information in graphic, tabular and numeric form by time period. Typically, only a sale should cause a decrease in store level inventory; therefore, it is valuable to compare the decrease in inventory to point of sale ("POS") data to analyze if a shrinkage problem exists in the supply chain 10. In addition, the user interface can also represents information in graphic, tabular and numeric form by time period for each truck shipment, each trucking region, each shipment on a ship, each shipment on a shipping line and each manufacturer.

Figure 9:
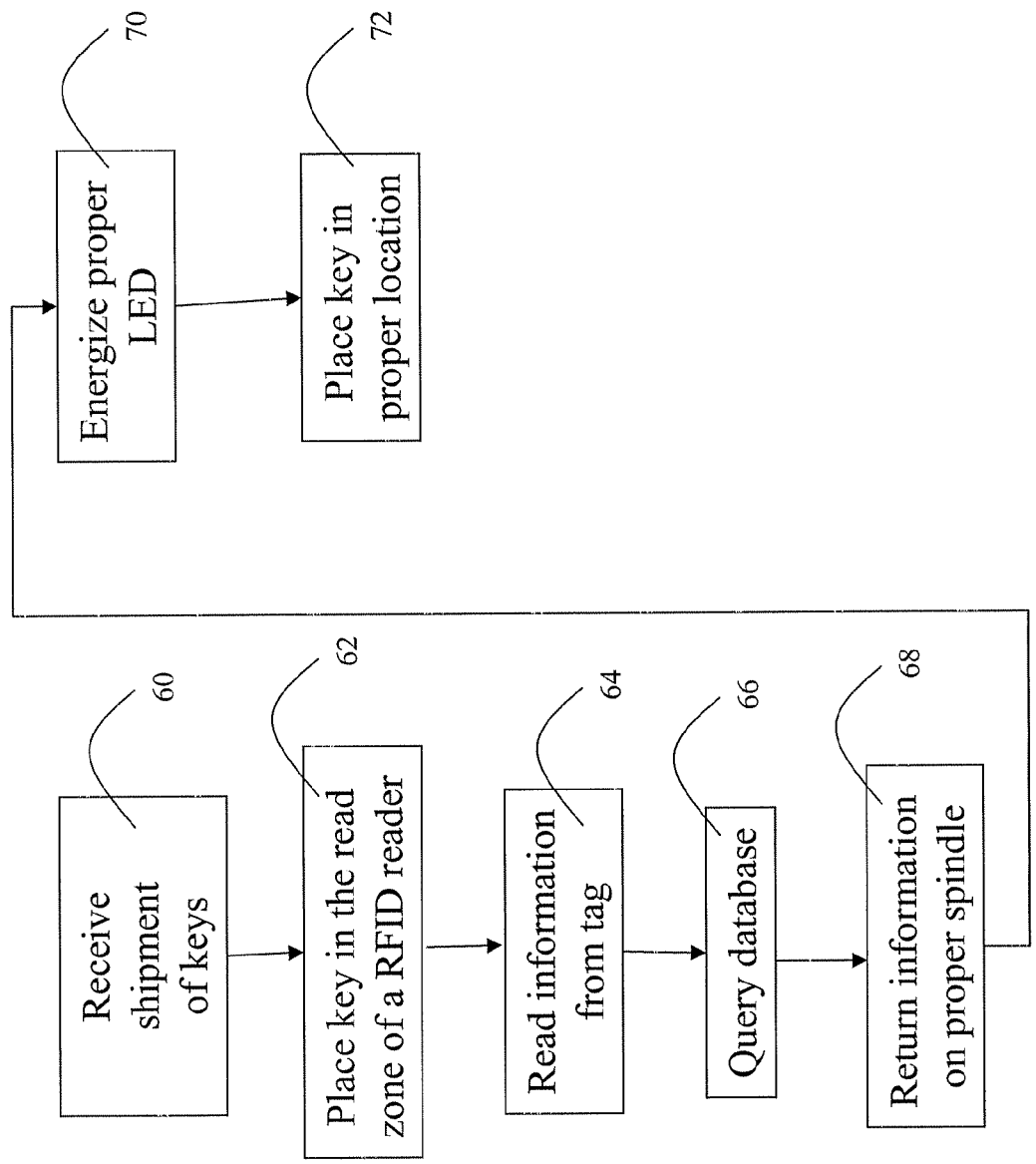
FIG. 9 is a process chart illustrating a method for restocking a RFID-enabled merchandising rack.

An RFID system that utilizes an RFID-enabled merchandizing rack 50 can be used in many ways to gain efficiency and accuracy in a supply chain. One example is to use an RFID system when restocking a RFID-enabled merchandising rack 50 in a retail environment. FIG. 9 shows a method of restocking a merchandising rack 50. When a new shipment of keys 32 is received 60, a stock clerk picks up individual keys for evaluation and placement on individual spindles 52. Currently, the accuracy of the restocking relies on the retail clerk's eyes, mind and hands. This extremely repetitive set of actions provides many opportunities for error. With the RFID-enabled merchandising rack 50, the retail clerk places a key 32 with an RFID tag 30 in the read zone of an RFID reader 62. The RFID reader reads information 64 from the attached tag 32 and queries 66 a database located on a host computer. The host computer returns information identifying the proper spindle 54 or bin on which the key 32 should be placed 68. The host computer sends a command to the rack 50 to energize 70 the LED 54 that corresponds with the correct spindle 52 or bin. The clerk then placed 72 the key 32 on the proper spindle or in the proper bin. Alternatively, the process may continue so that when the key bearing the RFID tag enters the appropriate read zone the LED 54 is again energized or an audible noise is produced indicating that the key blank 32 has been put on the correct spindle 52 or in the proper bin. If the key 32 enters the wrong read zone, an LED or audible noise is produced indicating that the key has been put on the wrong spindle or in the wrong bin. In addition, the date and time the key 32 was stored or displayed can be recorded by the RFID system and the store inventory and accounts payable accounts automatically updated. In addition, the identity of the stocking clerk can also be captured if he or she is wearing or possesses a RFID identity tag which passes through a read zone.

The RFID system allows each retail location the freedom to determine on which spindle to stock each type of key. The system does not require every store to stock a particular key or SKU number at the same predetermined location as all others stores. This is valuable because different stores and different geographies have preferences for different makes and types of keys and an RFID system with an RFID-enabled merchandising rack facilitates this choice. As a result, the rack allows for improved utilization of the rack space by each individual store location.

Figure 10:
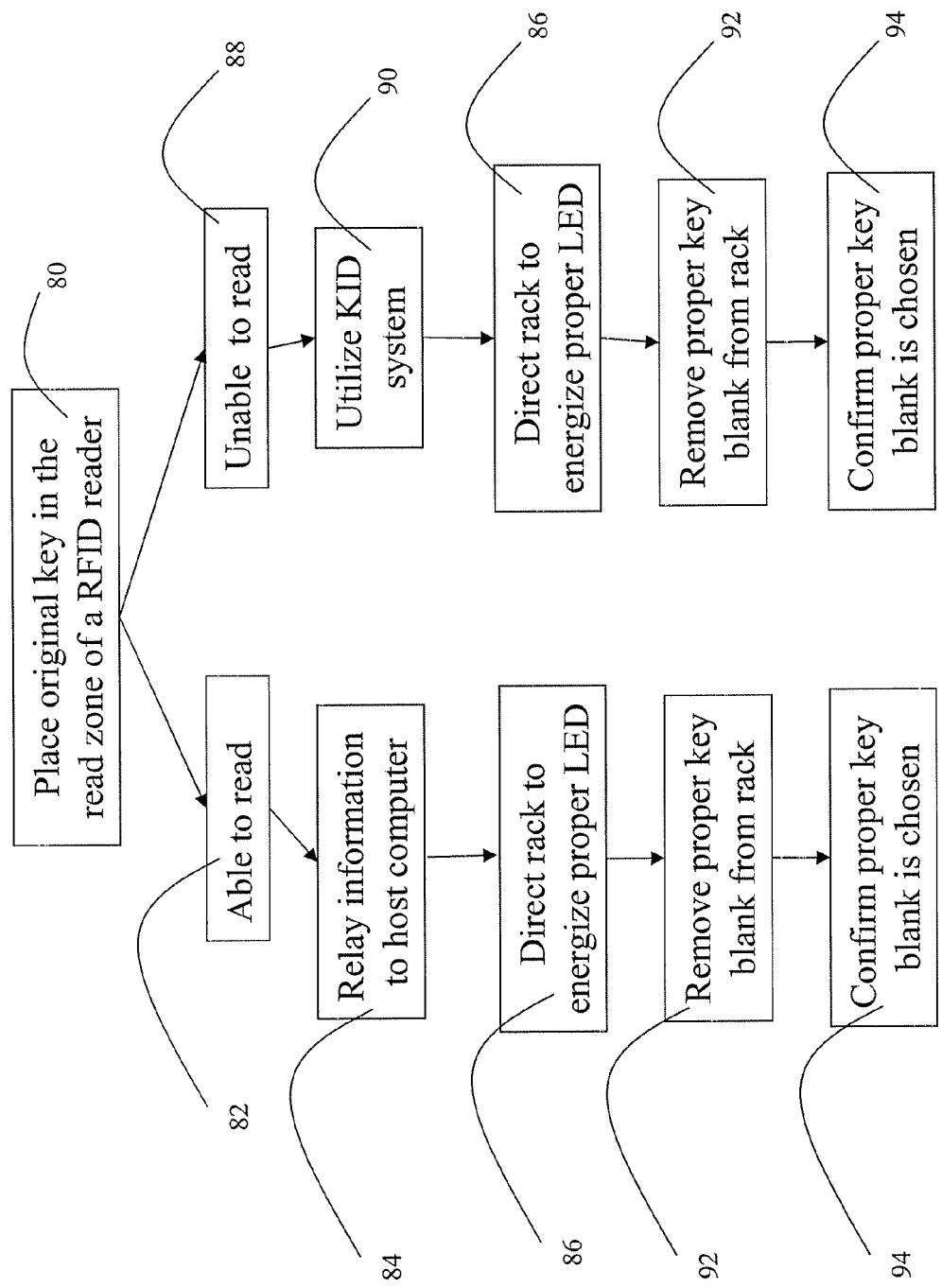
FIG. 10 is a process chart illustrating a method for choosing a proper key blank to make a duplicate key.

FIG. 10 illustrates a method for selecting key blanks for correctly producing duplicate keys. When a retail customer seeks to duplicate an original key, the selection of the proper key blank is critical. The original key is placed in the read zone of an RFID reader 80 in an attempt to read information from its RFID tag. If information can be read 82 from the original key an accurate identification can be made automatically. The reader can relay the information to a host computer 84, which can direct the merchandising rack 50 to energize the proper LED 86 indicating the spindle on which the key blank that matches the original is located. If the original does not contain an RFID tag or if the RFID tag cannot be read by the reader 88, then the user can utilize a KID system 90 to identify the proper key blank. After the KID system has identified the proper blank for selection, the host computer can send a signal to the merchandising rack 50 to energize the LED 86 that corresponds to the proper spindle.

Once the user has selected and removed a key blank 32 from the indicated spindle 92, the reader can read the RFID tag of the key blank that has been selected to confirm that the proper key has been selected 94. If the correct key has been selected and removed from the rack 50, an LED on the merchandising rack 50 can be energized or an audible sound can be produced to indicate success. If the wrong key has been removed, another LED on the merchandising rack 50 can be energized or a different audible sound can be produced to indicate that the wrong key blank has been selected. Alternatively, when the user has selected and removed the key blank 32 from the indicated spindle 92, the reader can be triggered to initiate an inventory. The inventory of the spindle with the removed key will be decremented by one. If the identity of the decremented SKU matches the identity of the original key, then the proper key has been selected and an LED can be energized or audible sound produced to notify the user. Conversely, if the wrong key blank has been selected, an LED can be energized or audible sound produced to notify the user of improper selection.

Figure 11:
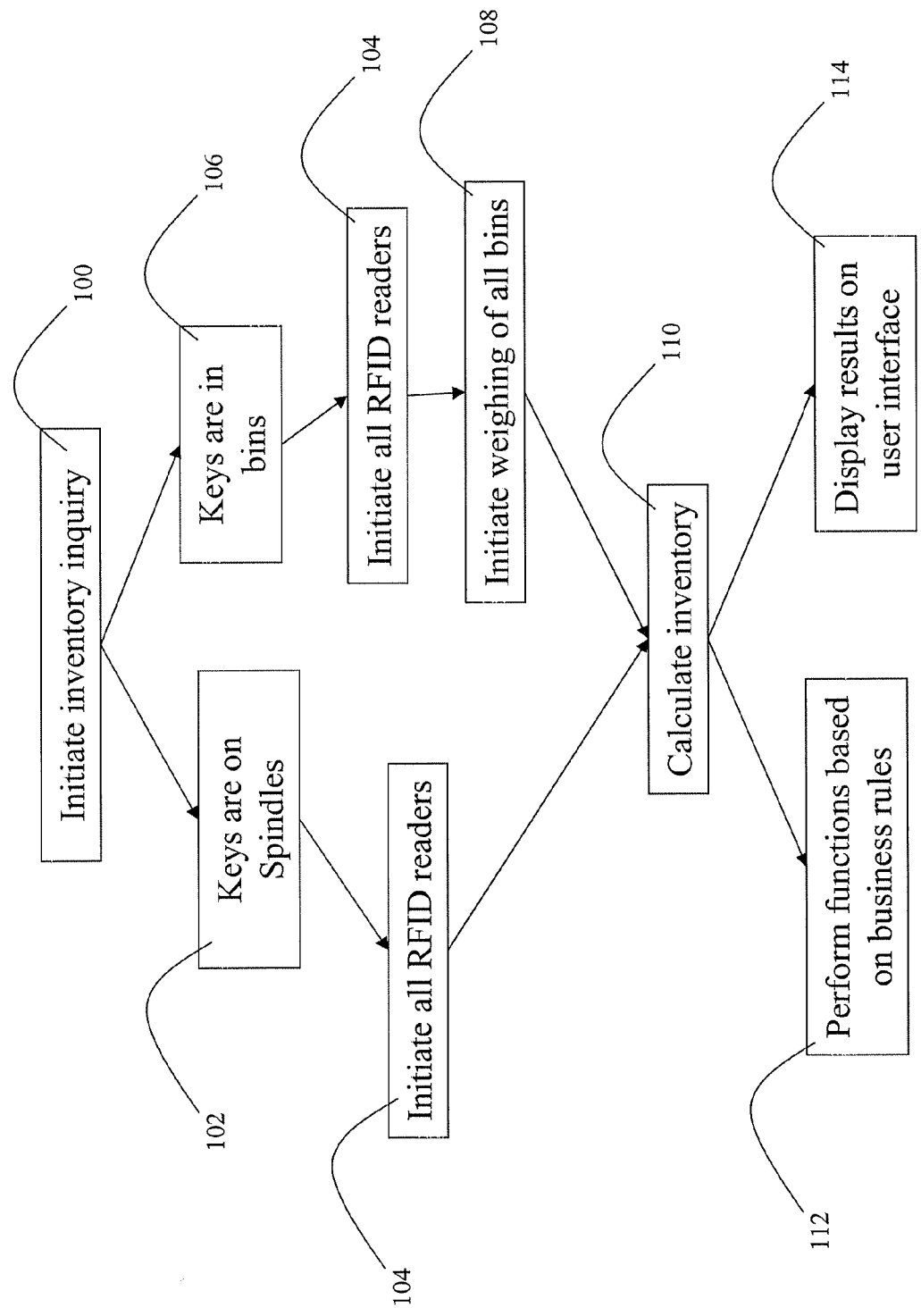
FIG. 11 is a process chart illustrating a method for determining the inventory of keys in a RFID-enabled merchandising rack.

FIG. 11 illustrates a method for real time or near real time inventory recording and shrinkage tracking and prevention. Periodically, an inventory requirement may be performed in order to determine actual inventory levels. Actual inventory levels can be compared to expected inventory levels to determine if inventory has been lost or stolen. In addition, actual inventory levels can be compared to business rules to determine if more inventory should be ordered or if existing orders should be cancelled. Determination of actual inventory begins with the initiation of an inventory inquiry 100. An inventory inquiry can be initiated by a system user or can be initiated by the host computer or RFID reader processing an automated rule. If keys are stored 102 on spindles 52 on a merchandizing rack 50, RFID readers on the rack 50 can be initiated 104 to inventory the rack 50. RFID readers will read all tags 30 that are within read zones and calculate an inventory 110. Alternatively if the keys are stored and displayed in bulk 106, all the bins can be weighed 108 and number of keys calculated 110.

Inventory inquiries may be automated to occur periodically or as requested by a user through a user interface. The host computer may request the inventory data or the data may be filtered by the middleware used by the readers and only communicated to the host computer if the inventory has changed in some fashion. In this way, real time or near real time inventory from every merchandising rack can be communicated to a host computer to be acted upon by automated business logic 112 or for incorporation into the information display on a user interface 114.

Figure 12:
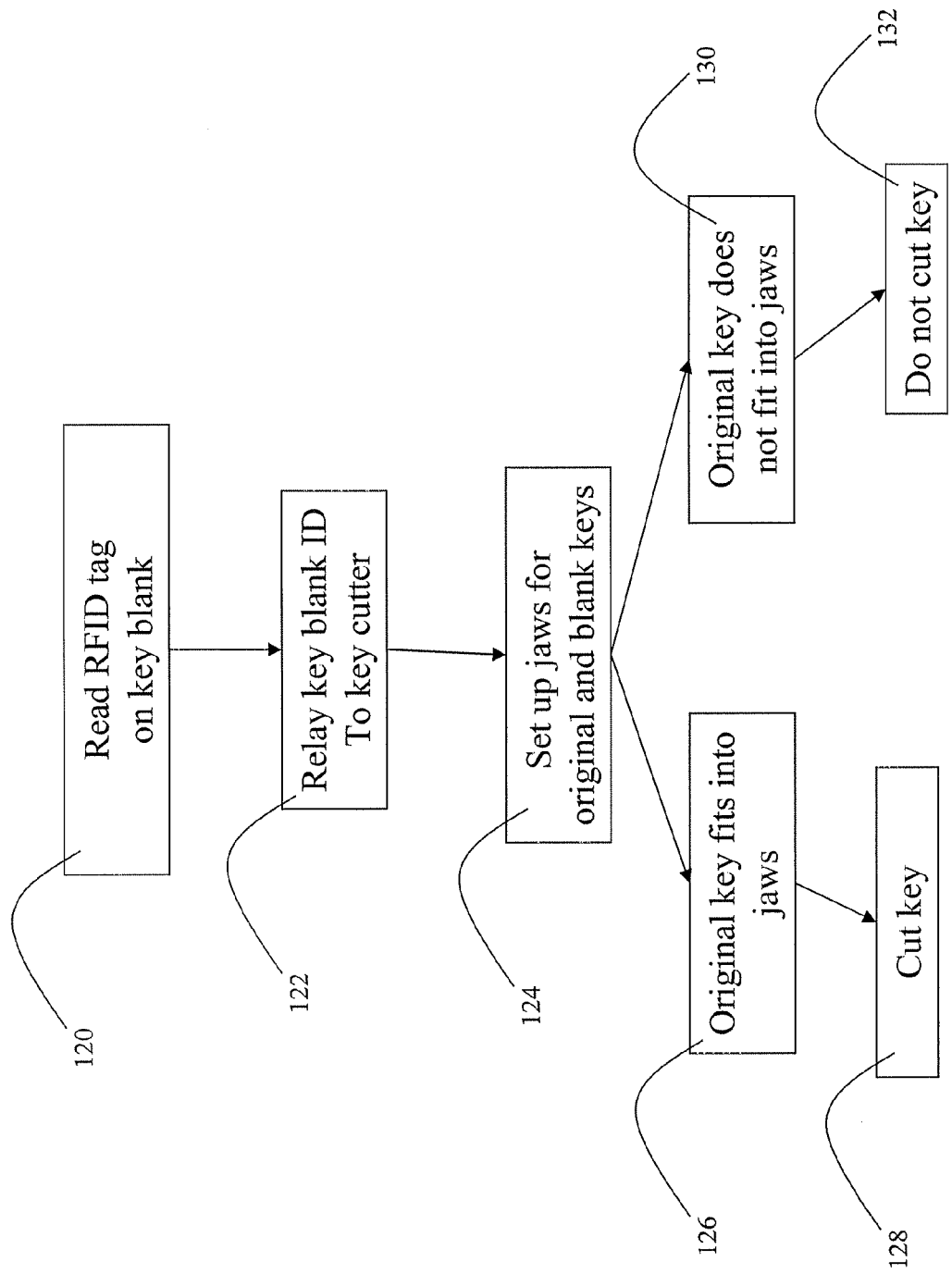
FIG. 12 is a process chart illustrating a method for using an RFID-enabled key cutter.
Figure 13:
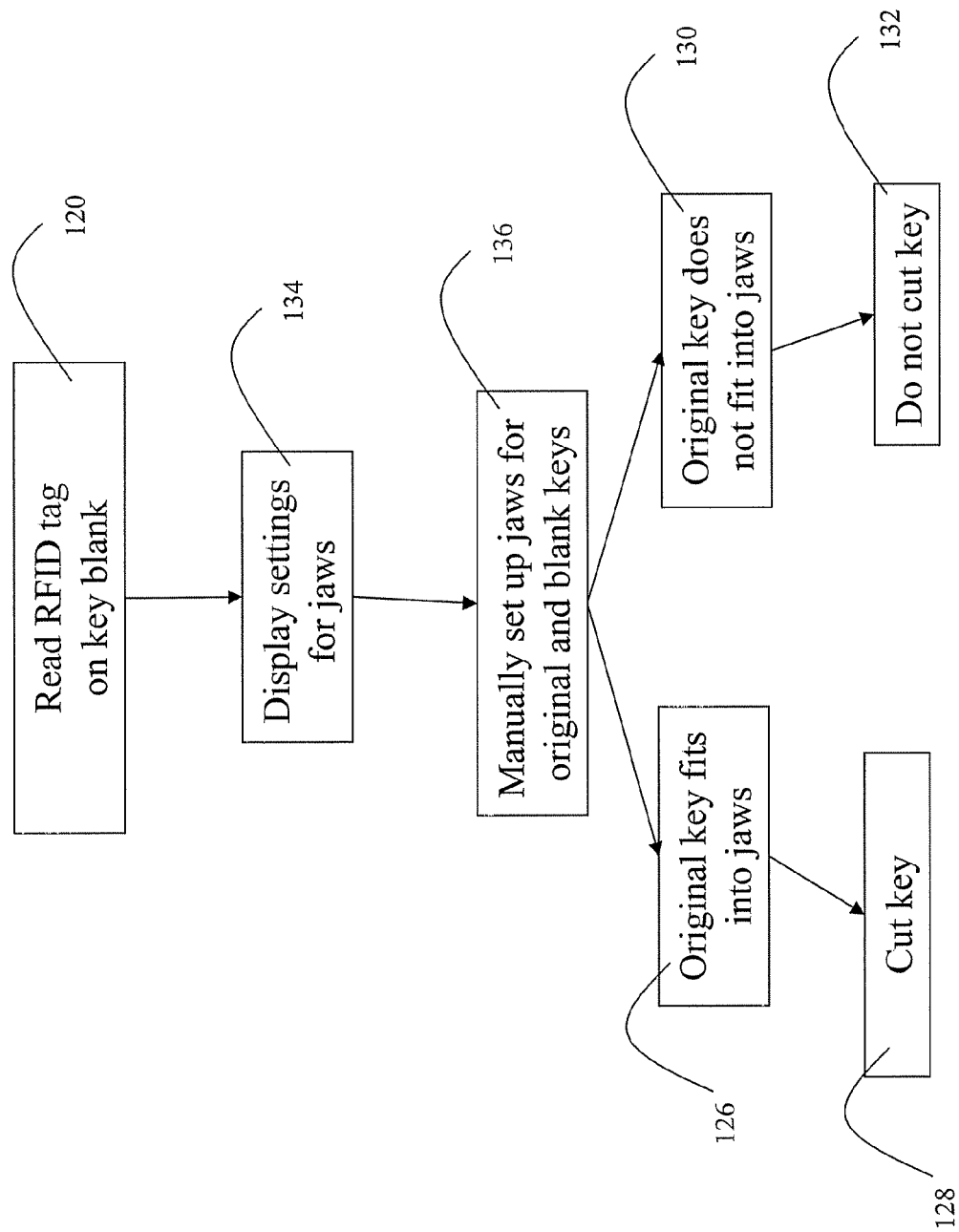
FIG. 13 is a process chart illustrating a method for using an RFID-enabled key cutter.

FIGS. 12 and 13 illustrate methods for using an RFID system with an RFID-enabled key cutter. The use of such a cutter can prevent miscutting of key blanks and thus help eliminate the waste and frustration that accompanies the cutting and attempted use of miscut key blanks. When a key blank has been selected for cutting, it is placed into the jaws of a key cutter for holding during the cutting process. The jaws of the key cutter are set up to receive the key blank and hold it in proper position for cutting. Similarly, the original key (i.e. the one to be duplicated) is placed into a similar pair of jaws so it can be held in proper position for tracing.

As shown in FIG. 12, an RFID reader reads the RFID tag of the key blank 120 and communicates the key blank's identity to the key cutter 122. The cutter will automatically set up its jaws to accept the key blank and the original key 124. If the original fits into the jaw configuration as set up 126, the user knows the correct key blank may have been chosen 128. If the original does not match the jaw configuration 130, the user knows that wrong key blank may have been selected 132 and that to proceed with cutting might result in a miscut.

As shown in FIG. 13, a manual mode is shown. In this mode, the blank key is read by a reader 120 and jaw settings are displayed via LED or other visual means 134 to instruct the user to set up the jaws for both the key blank and original key. The user than manually sets up the jaws 136. Again, if the original does not match the jaw configuration as set up 130, the user knows the wrong key blank may have been selected 132 and that to proceed with cutting may result in a miscut. If the original key fits into the jaw configuration 126, the blank key was properly selected 128.

It should be noted that the RFID reader used for the RFID-enabled key cutter may be the same reader and antenna that are part of the RFID-enabled merchandising rack or, alternatively, the reader may be part of the merchandising rack and the antenna part of the key cutter or, alternatively, both the reader and antenna may be part of the key cutter.

As has been discussed previously, RFID systems can be utilized to achieve efficiency and accuracy throughout the supply chain 10. Once a RFID tag 30 is incorporated or attached to each key 32, the RFID tag 30 and the information it holds can be utilized to achieve improvements in accuracy and efficiency. As illustrated in FIG. 1, a supply chain can include original manufacturers 12, carriers who move the product 14, 18, customs officials that inspect the product 16, suppliers and distributors 20, retailers 22, and end users 24. Increases in accuracy and efficiency can be gained by providing easy and convenient access to information concerning keys or groups of keys 32 stored on RFID tags 30 at each nodes of a supply chain 10 and utilizing that information in making business decisions.

It should be noted that the RFID tags 30 can be attached to the keys or key blanks 32 at many points in a supply chain 10; however, applying the tag 32 at the point of manufacturing offers the most downstream benefit.

The key industry supply chain 10 begins in the manufacturing facility 12, where original keys, prefabricated keys, and replacement keys 32 are produced from raw materials. Preferably, a step in the manufacturing process is the incorporation or attachment of a RFID tag 30 to the key 32. Once the key 32 is fabricated at the manufacturing facility 12, several types of useful information can be written to the RFID tag 30 for use later in the supply chain 10. Such information includes, for example, key type, lot number, name of manufacturer, and manufacturing date. This information can also be helpful to the manufacturer by being used to prepare keys and key lots 32 for packaging and shipping. The keys 32 are typically packed in boxes and loaded onto pallets for shipping. As the keys 32 are being loaded into boxes and then onto pallets, the individual RFID tags 30 can be read to insure that the proper quantity and type of keys are loaded into each box or onto each pallet. RFID tags 30 can also be affixed to each box and to each pallet. Useful information can be written to these tags 30, such as, box quantity, pallet quantity, originating address, destination address, shipment date, and employee identification. This information can later be used by the manufacturer to assemble products for final shipment and insure that orders are accurately fulfilled. A reading of the assembled products by a reader can be communicated to a host computer and can be used to produce a bill of lading for use with the shipment.

When an order of keys 32 leaves a manufacturing facility 12, it is often handled and transported to a destination by a cargo carrier 14, 18. It is advantageous for the carrier to confirm that the goods being transported match the order and the bill of lading provided by the manufacturer. The carrier can utilize a reader to establish that the quantity and type of keys that are being transferred are correct and accurate. The capabilities of RFID technology make this check quick and easy. Once the proper quantity and product is confirmed, the carrier can write further useful information to the RFID tag 30, such as receiving date, shipment date, and identity of the worker accepting the shipment.

At many points during shipping, the goods may have to be inspected by national or state authorities 16. Inspectors can confirm the quantity and type of goods by reading the RFID tags 30 on the keys, boxes, and pallets, which can be compared to the bill of lading. This action reduces the time needed to perform standard inspections. Once the inspection is complete, the inspector can write information to the RFID tags 30, such as inspection date, inspection location, and inspector's identity.

The shipping process 14, 18 may occur several times in the supply chain 10. Keys 32, such as any retail commodity, can be handled by many middlemen before reaching the final retailer 22. These middlemen include, for example, suppliers, distributors, wholesalers, and consolidators 20. These types of organizations can confirm the details of an arriving shipment by reading the information on the RFID tags 30 on the keys, boxes, and pallets and comparing it to the information on the bill of lading. This check can insure that no products were lost or stolen during shipment. Once the RFID tag 30 readings confirm the accuracy of the shipment, the information on the tags 30 can be used to appropriately stock or repackage the keys, update inventory records, and reconcile accounts receivable. Further useful information can then be written to the tags, such as receiving date, storage location, and workers identify. If the supplier choices to divide the shipment or consolidate it with other goods, the information on the tags 30 can be written or rewritten to correctly identify the quantity, location, and other critical information.

When a supplier, distributor, or other similar organization 20 is prepared to ship an order of keys 32 to a retailer or a middleman, it can utilize the same methods manufactures use when shipping products. The supplier or distributor can write shipment information to tags 32 located on each key, each box, and each pallet. This information includes origination address, destination address, retailer specific serial numbers, and shipment dates. The shipment carrier can utilize the RFID tags 30 in the same manner as described above for carriers that deal directly with the manufacturer.

Once a shipment arrives at a retailer 22 the RFID tags 30 can be used in a variety of ways to increase efficiency and accuracy. Upon arrival, the retailer 22 can read the RFID tags 30 to insure that the proper products and quantities are present and can add information to the tags 30 by writing a receiving date, along with the identity of the employee processing the shipment. When stocking the keys 32 at a merchandizing center, the RFID tags 30 can be read to determine the proper stocking location for each key or lot 32 and that location information can be written to the tag 30. General readings of the inventory can provide many benefits. Continuous readings can provide real time inventory, which can be proactively forwarded to suppliers and other business partners. Periodic readings can be made of the inventory to insure that no improper removal or theft has occurred since the last reading. In addition, specific readings can be conducted to find the location of a specific key or key lot.

On the retail floor the RFID tags 30 can be utilized to quickly locate a specific key 32 and to insure that the proper key 32 is being sold or proper replacement key is being cut. This reduces errors in sales and waste due to miscuts. In the case of replacement keys, it is important to be able to quickly identify the location of the proper key blank 32, which matches the original key to be copied. A reader can read the RFID tags on the retail floor and retrieve the location of the specific blank that matches the original key provided by a customer. This eliminates the need for employees to manually search the inventory and can even eliminate the need for the employee to determine which blank is appropriate. A general inventory reading of products on the retail floor can be taken and compared to sales records and warn of theft problems or improper shelving of keys. In addition, the key cutter itself may be designed to receive instructions based on information on an RFID tag 32 and to set itself up to receive the selected key blank in order to eliminate miscuts resulting from improper key cutter set up.

The maintenance of real time or near real time inventory information constitutes another application of RFID technology that is valuable throughout the key industry supply chain 10. It is desirable for all partners in the supply chain—manufacturers 12, carriers 14, 18, distributors 20, suppliers 20, and retailers 22—to be able to quickly obtain and share inventory information with one another. It is highly beneficial for one partner to know the quantity of product currently in the possession of another partner. For example, a manufacturer can adjust its output by knowing the amount of keys that are currently inventoried at the distributor, or a supplier can prepare shipments or initiate additional orders bases on the number of keys the retailer has in inventory. One method of obtaining this information is for the manufacturer or supplier to proactively count the inventory downstream. This can be accomplished by initiating readers located at the downstream locations. These readers can be configured to accept remote commands via the internet or a dedicated network connection. This enables a manufacturer to send a command, through the internet or dedicated network connection, to a reader that is located in the supplier's warehouse. The reader can then read all the RFID tags 30 in the warehouse and relay, though the internet or dedicated network connection, the number of a particular key type located in the warehouse. This allows the manufacturer to obtain instant information without having to rely upon responses from the supplier. This same method can be used by the supplier to determine when a retailer needs a new shipment of keys. The same method can be used to determine the upstream supply. It is useful for a retailer to determine if the supplier has sufficient inventory to fulfill the retailer's needs. If the retailer finds a lack of goods to fulfill its needs, it can either inform the supplier that more product is needed or search other suppliers' inventories to fulfill the need.

The end user 24 of a key 32 may also derives benefit from the application of RFID tags 30 on keys 32. As seen above, when the end user 24 returns to the retailer to duplicate a key 32, the RFID tag 30 can be used to greatly reduce the chances that a miscut will not occur, which frees the end user 24 of the frustration and waste of time caused by miscuts. In addition, the RFID tag 24 can be configured to contain additional memory for use as mobile data storage by the end user 24. An end user 24 may use the key 32 to hold retrievable data, such as automobile warranty information or dealer maintenance records on an automobile key that would convenience the user and save time.

Security information can also be written onto the tag 30 on a key 32, such as the end user's 24 name or a personal identification number ("PIN"). This information can be used to insure that unauthorized copies of the key 32 are not made. A service location or retailer of blank keys 32 that duplicates keys may review the security information, such as the owner's name, and cross check that against picture ID provided by the end user 24, to insure that the owner of the key is the one requesting a duplicate key. For an added layer of security or to preserve the owner's anonymity, a duplicate would only be made if a proper PIN number was provided by the customer, which matched the pin number stored on the RFID tag 30 on the key 32.

It should also be clear from this disclosure that the present invention has numerous additional uses than solely for the key industry and key supply chain 10. The present invention is equally applicable to other applications wherein the tracking of inventory of a multitude of like but not identical products through manufacturing, distribution and retailing in a merchandising rack that both stores and displays provides utility via improved business efficiencies.

We claim:

1. A key or key blank assembly comprising:
   a key or key blank having one or more physical characteristics; and
   an identification member secured to the key or key blank, the identification member including a programmable device that contains information indicative of one or more characteristics of the key or key blank that can be used to identify at least one of a) a physical characteristic of the type of key, b) a physical characteristic of the type of key blank, c) an origination address, d) a destination address, e) a manufacturer, f) a manufacturing date, and g) a lot number.

2. The key or key blank assembly of claim 1 wherein the identification member comprises a sheath.

3. The key or key blank assembly of claim 1 wherein the programmable device is an RFID.

4. The key or key blank assembly of claim 1 wherein the identification member is contained in a head of the key or key blank.

5. The key or key blank assembly of claim 1 wherein the identification member is secured to the key or key blank by an adhesive.

6. The key or key blank assembly of claim 1 wherein the identification member is tethered the key or key blank.

7. A key or key blank assembly comprising:
   a. a key or key blank having one or more physical characteristics; and
   b. an identification member secured to the key or key blank, the identification member including a programmable device that contains information indicative of one or more characteristics of the key or key blank that can be used to identify at least one of a) a physical characteristic of the type of key, b) a physical characteristics of the type of key blank, and c) cutting instructions for a key cutter to determine cut characteristics.

8. The key or key blank assembly of claim 7 wherein the programmable device is an RFID.

9. The key or key blank assembly of claim 7 wherein the identification member comprises a sheath.

10. The key or key blank assembly of claim 7 wherein the identification member is integrated into a head of the key or key blank.

11. The key or key blank assembly of claim 7 wherein the identification member is removably secured to the key or key blank.

12. The key or key blank assembly of claim 7 wherein the identification member is configured to be separable from the key or key blank and the identification member contains sufficient information to identify a key blank and cut a second key.

13. The key or key blank assembly of claim 7 wherein the identification member is sized to fit in a wallet.

14. A key assembly comprising:
   an automobile key; and
   an identification member secured to the automobile key;
   wherein the identification member includes memory for use as mobile data storage and
   wherein the mobile data storage is programmed with key cutting characteristics for cutting a duplicate key.

* * * * *